United States Patent Office 3,050,785
Patented Aug. 28, 1962

3,050,785
PROCESS WHICH COMPRISES FORMING A GEL FROM A SOLUTION IN A VINYLIDENE COMPOUND OF ISOTACTIC POLYMETHYLMETHACRYLATE AND SYNDIOTACTIC POLYMETHYLMETHACRYLATE AND POLYMERIZING SAID GEL
William J. Cunningham, Philadelphia, Pa., assignor to Rohm & Haas Company, Philadelphia, Pa., a corporation of Delaware
No Drawing. Filed July 7, 1960, Ser. No. 41,258
13 Claims. (Cl. 18—59)

This invention concerns a method for preparing addition polymers of improved properties by polymerizing at least one polymerizable vinylidene monomer in the presence of a mixture of poly(methyl methacrylate) of syndiotactic structure and of poly(methyl methacrylate) of isotactic structure. In an important aspect of this invention, there are dealt with methods for improving the coloring, especially the pigmenting of plastics formed from at least one monomer which undergoes addition polymerization under the influence of a free radical initiator by increasing the uniformity or improving the distribution of colorants, thus rendering effects more reproducible and certain with increased efficiency than has heretofore been practical. Thus, the process of this invention leads to improved colored plastic in the form of sheets, rods, tubes, or other shapes. Again, this process leads to improvements in the preparation of molding powders containing colorant and the molded products produced therefrom. Also, the process leads to other improved decorative effects.

Various procedures have been used for the preparation of pigmented sheets, rods, and tubes and of pigmented molding powders. In one of these procedures, pigment has been mixed with monomer along with polymerization initiator and other desired additives, such as release agent and stabilizer. The mixture has then been placed in a mold and heated. Pigment tends to settle out, causing uneven and non-reproducible effects. If several pigments are used, rates of settling are usually different for each. Even a single pigment may give differences which result in "two-sidedness," the cast object varying in appearance when viewed from different sides.

In another procedure, polymer or a thickening agent may be dissolved in the monomer to provide a more viscous mixture from which pigment should settle less readily. With some pigments this provides better distribution, but it does not altogether prevent "two-sidedness" from a single pigment, or uneven settling of several pigments. Nor does it provide in many cases desired reproducibility and uniformity.

In yet another method a pigment paste is ground or milled with polymer. The polymer may be softened with a minor proportion of monomer or with plasticizer. Intensive kneading and/or working is required. Even so, there may result a mottled appearance when the final mixture is sheeted or molded. While this may be overcome by repeated working, such reworking increases costs. There may occur some depolymerization with intensive working and reworking. Also, practical difficulties may arise during kneading or grinding of the mix, such as caking in a mill and formation of fine powders which require reworking for production of a useful molding powder.

In addition to the effects obtained with pigments and other colorants in plastics, other effects have been obtained by laminating over various objects. For example, fabric has been cemented onto a sheet of polymer and a layer of polymer formed thereover. Such procedures require a number of operations and present various difficulties which can be avoided by the method of this invention.

It has been discovered that marked improvements in colored and/or decorative plastics in castings and moldings are obtained by the process of this invention. Furthermore, improvements are effected by dissolving isotactic poly(methyl methacrylate) in monomer to be polymerized, bringing this solution into admixture with a solution of poly(methyl methacrylate) having syndiotactic chains or syndiotatic arrangements, coloring matter or decorative material being present when solutions of the two types of polymer are brought together, and polymerizing the resultant mixture. Under these conditions on one hand, polymer is obtained with a better and more uniform dispersion of color in polymer than has been heretofore obtained in casting and also in direct preparation of molding compositions and, on the hand, reproducible, decorative effects can be obtained with a minimum number of steps. In either case, there is made use of crystalline or crystallizable poly(methyl methacrylate).

Crystalline and crystallizable poly(methyl methacrylate) has been described in the literature. Fox et al., J. Amer. Chem. Soc., 80, 1768 (1958), described the preparation of and characterized poly(methyl methacrylate) of Type I, Type II, and Type III. Type I crystallizable polymer results from free radical polymerizations at low temperatures. Type II poly(methyl methacrylate) results by anionic polymerization in hydrocarbons, as with 9-fluorenyllithium at −60° C. in toluene. A magnesium, calcium, strontium, or barium polymerization initiator may also be used in a substantially non-solvating medium to initiate polymerization of methyl methacrylate to give Type II polymer. As prepared, these various types of polymers are crystallizable rather than crystalline, but are readily rendered crystalline by treatment with crystallizing solvents, that is, solvents which are at best mediocre solvents for poly(methyl methacrylate), such as 4-heptanone. But for purposes of this invention, such solvent treatment is not required. All that is necessary is that polymers having chains of predominantly isotactic or significantly syndiotactic arrangements be formed and used.

The types of crystallizable poly(methyl methacrylate) were further described by Stroupe and Hughes, J. Amer. Chem. Soc. 80, 2341 (1958), who established that Type I polymer is syndiotactic and Type II polymer is isotactic.

Identification and properties of the several types were further dealt with by Fox et al., J. Polymer Science 31, 173 (October 1958), where variations in infrared spectra were shown as useful for identifying the types of polymers, even as first formed. Identification has been confirmed by other polymer chemists. For example, Miller et al., Chemistry and Industry 41, 1323 (1958), confirmed the X-ray evidence and pointed out the differences in infrared spectra for the several types even before they had been crystallized. They had called the polymer of isotactic structure an α-polymer, and they relate this to Type II of Fox et al. and relate their β-polymer to Type I.

Additional information on these spectroscopic differences has been published by Baumann et al., Die Makromolekulare Chemie, 36, 81 (1959). Such spectroscopic data are important because they are given by polymers which have not been treated with crystallizing solvent and which give in that state amorphous patterns in X-ray diagrams. For purposes of this invention, it is merely necessary to use polymer of the correct type as shown by infrared spectra, for example, and the polymers need not be actually crystallized from crystallizing solvent, although such crystalline polymer can also be used.

The several types of crystallizable and crystalline poly(methyl methacrylate) have been further confirmed by Korotkov et al., Zysokomoleculyarnye Soedineniya 1, No. 9, 1319 (1959), who also identify types in the same way as Fox et al. Thus, polymer chemists have accepted identification of Type I polymers as syndiotactic and Type II polymers as isotactic.

In the work done with the various forms of poly(methyl methacrylate) it has been demonstrated that the usual polymers of commerce which are prepared by free radical polymerization appear amorphous by X-ray examination and crystallinity as established by X-ray evidence is not developed even upon treatment with crystallizing solvents. Yet, other properties, particularly infrared absorption, show that a significant proportion of the chains of usual free radically obtained polymers is in syndiotactic arrangement provided polymerization has been conducted below 100° C. If polymerization is effected at higher temperatures, however, poly(methyl methacrylate) appears truly atactic.

In the polymers obtained by free-radical initiation below 100° C. there are regions of infrared absorption which show the presence of syndiotacticity, as at 9.4 microns. There are other regions of absorption which are also due to syndiotactic sequences.

When the non-crystallizable, free-radically prepared poly(methyl methacrylate) shows the intermediate infrared absorption peak at 9.4 microns, it has been found to react in the same way as poly(methyl methacrylate) which is distinctly of Type I structure (syndiotactic) for purposes of this invention. It has been found that in such polymers there are enough syndiotactic sequences to give the desired co-action with isotactic polymer.

For a polymer of methyl methacrylate to be recognizable as syndiotactic or isotactic, it is not required that every mer be in the prescribed geometric relation to its neighboring mers. It is necessary merely that there be long enough chains of the proper orderly arrangement and/or there be a significant or preponderant proportion of chains having the proper geometric relations of mers needed for the particular type. There can thus be a difference in quality or extent of tacticity in either type of polymer. For purposes of this invention, it is only necessary that the respective types of poly (methyl methacrylate) give defining infrared absorption and that the Type II polymer be either crystallizable from solvent or crystalline as shown by X-ray analysis.

For purposes of this invention it is necessary first that polymer having isotactic structure be used (Type II), whether crystallizable or crystalline, provided the molecular weight is at least 1,000 and preferably 10,000 to 4,000,000, although polymers of molecular weights up to 8-10,000,000 or more are effective and useful.

Polymer corresponding to Type I or the equivalent is also used or is developed in the process of this invention. It should have a molecular weight of at least 10,000 and preferably from 50,000 to 4,000,000, although again, molecular weights up to 10,000,000 or more can be used. There is no sharp upper limit for molecular weights of either Type I or Type II polymers.

In an important aspect of this invention, the two types of polymer are separately dissolved in monomer or mixture of monomers which is to be polymerized. Polymerization initiator is placed in one or both solutions. In another aspect, one type is dissolved in monomer and the other type is dissolved in plasticizer or other solvent, and the two solutions are brought together with subsequent polymerization. In yet another aspect, Type II polymer is used in solution in monomer and Type I polymer is developed in this solution as it polymerizes.

Other agents may likewise be introduced into such solution or into one or both solutions containing the several types of polymer, such as an inhibitor, release agent, stabilizer, chain transfer agent, or additional plasticizer. Dye may be dissolved in one or both solutions. Pigment may be taken up in one or both solutions. When pigment is added and solution containing isotactic polymer together with syndiotactic polymer either supplied as such or developed in initial stages of polymerization is carried through the polymerization cycle, then solid polymer is formed in which pigment is well distributed. When the two types of poly(methyl methacrylate) are brought together, there is an interaction between them which provides a semi-rigid structure or gel which enmeshes and holds pigment. In a variation of the process a gel may be formed without or with pigment, whereupon decorative material is placed on the gel and covered with monomer to be polymerized, preferably, but not necessarily treated to give a gel from the two types of poly(methyl methacrylate), the assembly then being subjected to polymerizing conditions.

The first monomer of interest is methyl methacrylate, which may be used as the sole monomer or may be mixed with one or more other polymerizable vinylidene compounds, such as other methacrylates, including ethyl, propyl, butyl, amyl, octyl, dodecyl, octadecyl, benzyl, phenyl, cyclopentyl cyclohexyl, dicyclopentyl, ethoxyethyl, butoxyethyl, phenoxyethyl methacrylates or corresponding acrylates. Likewise, similar itaconates may be used as well as acrylonitrile, methacrylonitrile, acrylamide, or methacrylamide or their N-substituted derivatives, acrylic or methacrylic acid, styrene, p-methylstyrene, α-methyl styrene, and other types of polymerizable esters, including vinyl acetate, vinyl propionate, vinyl butyrate, and vinyl caprylate, all of which thus far are monovinylidene compounds, and also polyvinylidene compounds when cross-linking is desired, such as ethylene dimethacrylate or acrylate, divinylbenzene, trivinylbenzene, vinoxyethyl methacrylate or acrylate, vinylthioethyl methacrylate or acrylate, or allyl methacrylate. The purpose of such additional comonomer or comonomers is to vary properties of the final polymer in well known ways. Typical useful mixtures of monomers are 55% methyl methacrylate and 45% ethyl methacrylate, 60% methyl methacrylate and 40% butyl methacrylate, 65% methyl methacrylate and 35% styrene, 85% methyl methacrylate and 15% ethyl acrylate, 80% methyl methacrylate and 20% methyl acrylate, 90% methyl methacrylate and 10% propyl or butyl acrylate, and 65% methyl methacrylate, 30% ethyl methacrylate, and 5% octyl or dodecyl methacrylate.

There may also be used in mixtures of monomers minor proportions of other ethylenically unsaturated polymerizable compounds, such as alkyl esters of maleic or fumaric acids, vinyl ethers, vinyl ketones, glycidyl methacrylate, or other copolymerizable monomers. A vinyl ether of special interest is hydroxyethyl vinyl thioether which serves not only as a source of mers but also as a chain transfer agent and a thermal stabilizer. Other vinyl thioethers can also be used.

A second main class of monomer is found in the styrene field. Here styrene itself may serve as the monomer for making solutions of syndiotactic and isotactic poly(methyl methacrylate), which are mixed and polymerized according to this invention. Styrene may be modified with other polymerizable ethylenically unsaturated monomers such as shown above for causing modifications in polymers based on methyl methacrylate. There must also be mentioned methylstyrene which is used to provide polymers of improved heat resistance and copolymers derived from styrene and acrylonitrile, styrene in major proportion and methyl methacrylate in minor proportion, methylstyrene and acrylonitrile, etc.

In addition to polymers based upon methyl methacrylate and styrene, there may be formed polymers based on other vinylidene compounds which yield solid polymers. These compounds may be monovinylidene or polyvinylidene monomers or mixtures thereof. As is known, the presence of even a minor proportion of a polyvinylidene monomer in admixture with polymerizable monovinylidene monomer causes the copolymer formed therefrom to be cross-linked. While some of the divinylidene monomers yield hard, coherent polymers by themselves, they are commonly advantageously used in conjunction with one or more monovinylidene compounds.

Compounds which give solid polymers include isobutyl and tert-butyl acrylates and methacrylates, cyclohexyl, cyclopentyl, dicyclopentyl, benzyl, phenyl, phenoxyethyl, benzoxyethyl, benzoxymethyl, bornyl acrylates and methacrylates or similar acrylic esters having a ring in the alcohol residue thereof, methyl or ethyl α-chloroacrylate, other α-substituted acrylates, allyloxymethyl or allyloxyethyl acrylate or methacrylate, diallyl phthalate, diallyl adipate, diallyloxyethyl carbonate, allyl diglycolyl allyl glycolate, zirconyl acrylate, trichloroethyl methacrylate, 2-chloroethyl methacrylate, etc.

There may be used mixtures of two or more of such monomers or mixtures of one or more of these monomers with any of the monomers shown above.

In general, the process of this invention is operable with any polymerizable vinylidene monomer which forms solid polymers under the influence of a free radical initiator. Any of the monomers may be used in which poly(methyl methacrylate) of Type I and Type II is sufficiently soluble to provide a concentration yielding a gel when these types are mixed.

As polymerization initiators for converting monomer to polymer there is best used a free radical catalyst. These include peroxidic and azo compounds and also compounds which provide free radicals under the influence of actinic light. Typical peroxidic initiators include acetyl peroxide, caproyl peroxide, lauroyl peroxide, benzoyl peroxide, methyl ethyl ketone peroxide, tert-butyl perbenzoate, di-tert-butyl perphthalate, 2,2-bis(tert-butylperoxy)-butane, tert-butyl hydroperoxide, cumene hydroperoxide, diisopropyl benzene hydroperoxide, p-menthane hydroperoxide, pinane hydroperoxide, 2,5-dimethylhexane-2,5-dihydroperoxide, and other tert-alkyl peroxides and hydrocarbon-substituted benzene hydroperoxides.

Typical azo initiators include azodiisobutyronitrile, azobisdimethylvaleronitrile, azodiisobutyramide, azobis(α-ethylbutyronitrile), azobis(α,γ-dimethylcapronitrile), and azobis(dimethylisobutyrate). The azo catalysts are useful for initiating polymerization at relatively low temperatures and also serve in providing free radicals under illumination with ultraviolet light even at temperatures down to −50° C.

As is known, free radicals can be formed under such illumination also with photosensitive materials as benzoin, fluorescin, acyloin, and other α-carbonyl alcohols. An amount of 0.01% to 4% may be used on one or more of these based on the weight of the monomeric composition to be polymerized.

The amount of free radical initiator or initiators may be widely varied depending upon the monomer or monomers, the nature of the initiator, the sort of polymer desired, especially with respect to molecular size and distribution, the temperatures at which it is desired to initiate and complete polymerization, the bulk and nature of the casting to be formed, and other influencing factors. The range of 0.001% to about 5% of initiator may be used based on the weight of the monomer or monomers. In the absence of inhibitor very low concentrations of initiator may be used.

Initiation may be hastened at a given temperature level or effected at a lower temperature level by use of an activator, which may be often further accelerated by use of a promoter. Thus, the hydroperoxide initiators may be utilized in conjunction with a quaternary ammonium compound. With this initiating system free radicals appear at temperatures lower than that at which they form in the absence of activator.

Typical quaternary ammonium salts which are useful include trimethylbenzylammonium chloride, dibenzyldimethylammonium bromide, butyldimethylbenzylammonium chloride, octyltrimethylammonium chloride, dodecyldibenzylammonium chloride, nonylbenzyltrimethylammonium bromide, dodecylbenzyldimethylbenzylammonium chloride, didocenyldimethylammonium chloride, benzyldimethyldodecenylammonium chloride, octylphenoxyethyldimethylbenzylammonium chloride, diisobutylphenoxyethoxyethyldimethylbenzylammonium chloride, cetylpyridinium chloride, N-octyl-N-methylmorpholinium chloride, and bis and tris quaternary salts with alkylene chains, ether-containing groups or amide-containing groups between nitrogens.

There are amines, particularly those having an aromatic group, which activate acyl peroxides, such amines as N,N-dimethylaniline, N,N-dibutylaniline, tribenzylamine, or N-methyl-N,N-diphenylamine being effective at 0.002% to 2% based on the weight of monomers. The action of these may be promoted with 0.002% to about 0.1% of a thiophenol. With such initiating systems, polymerization can be started at temperatures as low as −20° C. and used up to 100° C. with a preferred range of 0° to 50° C. It may be noted that low temperature polymerizations are of especial interest when it is desired to develop polymer of sufficient syndiotactic structure in situ to form a gel with added isotactic polymer.

Thus by choice of initiator or initiator systems polymerization may be started between −50° C. and about 100° C. and after 5% to 10% polymerization has occurred, completed between −50° C. and 150° C. Polymerization may thus be started at one temperature, carried on at another, and, if desired, completed at yet another temperature. The polymerization may be effected at normal or other pressure or pressures. If elevated temperatures are desired after initial polymerization (above the normal boiling point of a monomer or monomers), superatmospheric pressure may be utilized to prevent loss of monomer. Thus, for example, an autoclave may be used to contain the object being polymerized. If desired, an inert atmosphere, such as nitrogen or helium, may be employed.

Additives may be supplied to the system to be polymerized. Commonly, release agents are used such as stearic acid, fatty alcohols from lauryl to stearyl, or lecithin at concentrations from about 0.005% to 0.5%. Light stabilizers are often desirable, typical materials of this sort being methyl salicylate or salol in amounts of 0.001% to 3%. Chain transfer agents of 0.002% to 0.1% may be added, such as octyl mercaptan, dodecyl mercaptan, thiurams, or dithiocarbamates.

While comonomers which normally form homopolymers less hard than polymers of methyl methacrylate and styrene can be used to impart internal plasticizing effects, there may also be used conventional plasticizers which serve to soften and flexibilize. Thus, there may be used such liquids as butyl lactate, dibutyl phthalate, dioctyl phthalate (usually di-2-ethylhexyl phthalate), dibenzyl phthalate, dibutoxyethyl phthalate, dibutyl sebacate, azelate, or adipate, dioctyl sebacate, azelate or adipate, dinonyl sebacate, azelate, or adipate, acetyl triethyl citrate, butylene dicaprylate, or polyethylene glycol dibenzoates. From about 0.5% to 10% or more of one or more plasticizers may be used.

In addition to the liquid plasticizers there may also be used in minor proportions conventional polymeric plasticizers which are essentially nonvolatile and nonmigrating. Typical of these are polyesters formed from dicarboxylic acids, such as adipic, azelaic, and sebacic, and glycols and polyglycols such as ethylene, propylene, butylene, diethylene, and tetraethylene, and mixtures thereof.

The plasticizer or plasticizers may be used to take up pigment or other colorant, if so desired. On the other hand, they may be used to dissolve one of the essential types of poly(methyl methacrylate).

If desired, dye may be incorporated with one or more of the mixtures which comprise monomer and polymer. The term dye is here used in the sense of a coloring material which is soluble in the monomer mix to distinguish over pigments which are insoluble. Any dyestuff which is soluble in one or more of the mixtures to be polymerized can be used, but some classes of dyes appear better than others. There may, for example, be used basic dyes, such as C.I. Basic Green 4, C.I. Basic Blue 26, C.I. Basic Violet 3, C.I. Basic Yellow 2, or C.I. Basic Red 1. There may be used disperse dyes, which may be illustrated with C.I. Disperse Yellow 12, C.I. Disperse Orange 11, C.I. Disperse Red 9, C.I. Disperse Violet 1, C.I. Disperse Blue 14, or C.I. Disperse Green 1. Vat dyes soluble in a monomer may also be used, such as C.I. Vat Yellow 3 and C.I. Vat Violet 15. Typical solvent dyes include C.I. Solvent Yellow 14, C.I. Solvent Orange 7, C.I. Solvent Red 24, C.I. Solvent Violet 14, C.I. Solvent Blue 13, or C.I. Solvent Green 3. Fluorescent brightening agents may also be used, as, for instance, C.I. Fluorescent Brightening Agent 70.

Coloring matter that is insoluble or only slightly soluble in monomer or mixtures of monomers is incorporated in the polymerizable mixture. The term pigment as applied to such coloring matter is here used in the broad sense of a powdered or powderable material which can be mixed with liquid to impart color thereto, including black and white (except by dyeing). The term thus includes lakes, toners, and organic and inorganic pigments. The term pigment includes those that are opaque, translucent, and transparent. Transparent pigments are those which impart color without opacity and without being dissolved.

Inorganic pigments may be natural or synthetic. They are usually metallic compounds. Typical of these are barium sulfate, titanium dioxide, zinc oxide, zinc sulfide, zirconium oxide, various lead compounds, lithopone, China clay, magnesite, mica, iron oxides, and other iron-containing pigments, such as hematites, whether Spanish, Persian, or American, siennas, iron oxides from calcining copperas, or hydrated yellow oxide, Venetian reds, cadmium yellows, oranges, reds, and maroons, including cadmium sulfoselenide, cadmium yellows prepared with zinc sulfide or barium sulfate, cadmium lithopones, or cadmium sulfoselenides, umbers, metallic browns such as calcium limonite or siderite, brown iron oxides, ochre, synthetic yellow or orange iron oxides, chrome yellows, antimony yellow, chrome greens, iron blues, ultramarine blue, cobalt blue, cobalt violet, cerulean blue, black iron oxides, carbon blacks including channel and furnace blacks, luminous and phosphorescent pigments including special grades of zinc sulfide and activating agents, leafy pigments giving pearlescent effects such as "pearl pigment" (fish scales), lead iodide, mercurous chloride, or bismuth oxide, metal bronzing powders which include leafed aluminum powders, aluminum-Bronze "pearl" bronze powders, and copper-aluminum bronze powders, and also leafed gold, silver, copper, and nickel.

Organic pigments have been classified by Dr. Vincent C. Vesce into seven main classes—the basic class of which includes such coloring materials as auramine O, methyl violet, rhodamine B, and methylene blue; the insoluble azo class, which includes such coloring materials as toluidine red, Hansa yellow, and pyrazalone red; the precipitable azo class, which includes such typical materials as lithol red, helio Bordeaux, pigment scarlet, and perm. red 2B; the condensation acid class which includes such coloring materials as alkali blue and eosine; the anthraquinone and vat class which includes alizarin, indanthrone, and thioindigo maroon; the phthalocyanine class, which is very important and includes such materials as phthalocyanine blue B, G, NC, and NF; phthalocyanine green B and G, and sulfonated phthalocyanine; and the miscellaneous class which includes carbazole violet, pigment green B, and quinacridone reds. The organic coloring matters differs considerably in light-fastness and are selected not only for the color or shade desired, but for conditions which are encountered in the use of the pigmented plastic and in the polymerization of the mixture. Thus, organic pigments are selected not only for shade but also resistance to the possible action of the initiator system. Conversely, the initiator system may be adapted to the pigment. In the case of organic colors which tend to be soluble in the monomer system, the color may be used in a lake.

The pigment or pigments should be dispersed in the monomer system. Some pigments can be worked or milled into monomer, polymer, or mixture of monomer and polymer without added dispersing agents. In other cases, it may be desirable to utilize a dispersing agent to overcome agglomeration of pigment. Typical dispersing agents include lignin sulfonates, condensed naphthalene-formaldehyde sulfonates, polymers of maleic anhydride and an olefinically unsaturated polymerizable monomer, such as styrene, diisobutylene, or a nonylene, and which may be in salt form or in the form of an imide, or a wetting agent such as sodium dodecylbenzenesulfonate, dodecyl sodium sulfate, or octylphenoxypolyethoxyethanol.

Pigment may be mechanically mixed with monomer or monomers or with a monomer-polymer mixture or with a polymer. The resulting mixture is then taken up in the rest of the monomer or monomer-polymer mixture. Milling of pigment may be done with a wide variety of polymeric materials which may be the same as or different from that to be used in the monomer-polymer system. Any soluble acrylic polymer may be used in this way. Likewise, pigment may be milled with a soluble styrene polymer or copolymer. Vinyl chloride and/or acetate polymers may also be used and may be especially useful for dispersing carbon blacks. There may also be used cellulose acetate or cellulose acetate-butyrate. Nitrocellulose is commonly used in "pearl essence," and dispersion of fish scales, and also with carbon black and with dispersions of phthalocyanines.

When plasticizer is used, it may be desirable to grind or mill pigment therein. A mixed plasticizing system of liquid plasticizer and polymeric plasticizer is quite effective in dispersing various pigments and the resulting paste is readily taken up in monomer.

In a variation of the process of this invention a solution of isotactic poly(methyl methacrylate) in methyl methacrylate can be prepared by initiating polymerization with an anionic initiator and interrupting polymerization. In this situation the solution of poly(methyl methacrylate) in methyl methacrylate is used directly. There is added a desired initiator, one or more additives, and any colorant, if such is to be used. Typical preparations of a solution of isotactic polymer follow.

A. A five hundred milliliter flask is equipped for conducting polymerizations under substantially anhydrous conditions by fitting it with multiple inlet tubes for monomer, initiator, and dry nitrogen, and a stirrer. Also provided in an outlet venting through a two-inch head of oil. Prior to operation, the apparatus is flushed with prepurified nitrogen for thirty minutes. Then, two hundred milliliters of methyl methacrylate is added to the flask. Nitrogen is then bubbled through the monomer for two hours. To the monomer still at room temperature is added dropwise over a seven-minute period four milliliters of 1.6 molar sec-butyl-magnesium bromide in ether. No appreciable temperature rise is noted. The material in the flask is kept under a nitrogen atmosphere for sixteen hours. The product is a turbid non-viscous liquid. Two milliliters of methanol is added to neutralize unused initiator. This solution can be used directly.

To determine the extent of polymerization and identify the polymer, polymer is isolated by precipitation of the reaction material into a mixture of methanol, water, and hydrochloric acid. The isolated polymer represents a yield of 1.1% of poly(methyl methacrylate) in monomeric methyl methacrylate. The polymer has a reduced specific viscosity of 0.060 liter per gram in chloroform, corresponding to a molecular weight of 130,000. Examination of the polymer by infrared absorption shows that the material has an isotactic structure.

B. A five hundred milliliter flask is equipped for conducting experiments under substantially anhydrous conditions by fitting it with multiple inlet tubes for monomer, initiator, and dry nitrogen, and a stirrer. Also provided was an outlet venting through a two-inch head of oil. Prior to operation, the apparatus is flushed with prepurified nitrogen for thirty minutes. Then, two hundred milliliters of methyl methacrylate is added to the flask. Nitrogen is then bubbled through the monomer for two hours. To the monomer at 28° C. is added dropwise 2.4 milliliters of isopropylmagnesium bromide, 3.6 molar in diethyl ether. Addition is made over a twenty minute period. The material in the flask is kept under a nitrogen atmosphere for sixteen hours. The product is a turbid viscous material. Five milliliters of methanol is added to neutralize unused initiator.

For purposes of analysis and identification, polymer is isolated by precipitation of the reaction material into a mixture of methanol, water, and hydrochloric acid. The isolated polymer shows a yield of 7.3%. The polymer has a reduced specific viscosity of 0.5 liter per gram in chloroform, corresponding to a molecular weight of about 240,000. Examination of a polymer film by infrared absorption shows that the material has an isotactic structure.

The solution of Type II poly(methyl methacrylate) in methyl methacrylate can be admixed with a solution of Type I poly(methyl methacrylate) along with colorant, initiator, and other additives, as desired. This mixture is then subjected to polymerizing conditions.

A somewhat comparable procedure may be followed in preparing a solution of Type I polymer. For example, polymerization can be initiated below 0° C. with a free radical catalyst, as benzoin under the influence of ultraviolet light or with an activated free radical initiator system below about 0° C. or with an anionic initiator below −40° C. in the presence of a polar highly solvating solvent, such as liquid ammonia and methyl methacrylate containing moisture with only partial polymerization which is interrupted by addition of an acid acting substance such as ammonium chloride.

The amounts of Type I and Type II polymers which are needed can be varied from about 0.5% to over 25% each. The preferred ranges are 1% to 10%. When the poly(methyl methacrylate) is well oriented syndiotactically and/or isotactically, there may be used, relatively smaller amounts than when tacticity is less well developed along the entire polymer chains. Such development or lack of development is shown by differences in infrared absorption of tactic polymers as compared to those of atactic polymers. When tacticity of the polymer type is well developed, only small amounts of the oriented polymers are required to give gelation. As explained, gelation results from interaction between the two types when they are present together. Gel formation holds pigment or other decorative materials in position.

There may also be used in the monomer or monomer mix one or more preformed polymers other than Type I or Type II poly(methyl methacrylate), such polymer being preferably soluble in the monomer mix. Thus, conventional atactic forms of poly(methyl methacrylate) may be dissolved with such function as increasing viscosity and supplying less material to be polymerized with decreased contraction on polymerization. There may likewise be other polymers of derivatives of acrylic and methacrylic acid, such as ethyl, butyl, octyl, lauryl, and mixed alkyl esters, esters with cyclohexyl, cyclopentyl, benzyl, phenyl, dicyclopentyl, tetrahydrofurfuryl and other ring-containing residues, esters with alcohol residues containing a heteroatom, including oxygen, sulfur, and nitrogen, as in the alkoxyalkyl, alkylthioalkyl, dialkylaminoalkyl, or pyrrolidinyloxyethyl groups. There may be dissolved from about 0.5% to over 25% of a preformed polymer other than a Type I or Type II polymer or methyl methacrylate. Such soluble polymer may be dissolved in monomer containing either Type I or Type II polymer or in each of the solutions containing Type I and Type II.

Details of the process of this invention are presented in the following illustrative examples wherein parts are by weight unless otherwise designated.

*Example 1*

In this example comparison is made of a pigmented polymer prepared according to the process of this invention with a pigmented polymer prepared in a conventional manner.

A master colorant suspension is prepared by milling 160 parts of powdered barytes with 40 parts of a powdered copolymer prepared from a mixture of 85% methyl methacrylate and 15% ethyl acrylate to give a molecular weight of about 100,000.

There are mixed together with stirring 8935 parts of methyl methacrylate, 893 parts of ethyl acrylate, 98 parts of stearic acid, 2 parts of lauroyl peroxide, 2 parts of tert-butyl perbenzoate, 18 parts of 2-mercaptoethanol, 49 parts of methyl salicylate, and 149 parts of the above master colorant suspension. The resulting mixture is divided into several portions.

(a) One portion of this mixture is placed in a vessel and subjected to reduced pressure to remove gases. It is then run into a bag of cellophane which is sealed and placed in an oven, where it is heated for 18 hours at 65°–70° C., for 2 hours at 80° C., and for 6 hours at 120° C. The solid polymer which has formed is removed from the container and examined. Almost all of the barytes pigments is found in a compact layer of about 15 microns depth on the lower side of the polymer.

(b) Another portion of the above master mix is taken and treated with 2 parts of syndiotactic poly(methyl methacrylate) per 100 parts of the mixture. This syndiotactic polymer was prepared by free radical polymerization of methyl methacrylate at −50° C. in toluene solution containing benzoin which was subjected to ultraviolet light for 15 hours, the polymer which formed being precipitated in methanol. This polymer has a molecular weight (viscosity average) of about 60,000.

Another portion of the master mix is treated with two parts of isotactic poly(methyl methacrylate) per 100 parts of mix. This isotactic polymer was prepared by dissolving 50 parts of methyl methacrylate in 200 parts of anhydrous toluene and treating with 10 parts of a phenyl magnesium bromide solution at 25° C. The resulting polymer was precipitated in methanol and washed with methanolic hydrochloric acid and again with methanol before drying. This polymer has an infrared absorption spectrum corresponding to that for the isotactic polymer and, when treated with 4-heptanone, gives a crystalline polymer which provides an X-ray diffraction pattern of Type II. It has a molecular weight of about 100,000.

Equal volumes of these two solutions containing Type I and Type II polymer respectively are taken and subjected to reduced pressure to remove gases. The two solutions are then run together and mixed in a cellophane bag. The resulting mixture rapidly forms a gel. The gel is subjected to the same polymerization cycle as used above. The resulting polymer is removed from the container. Examination of the casting shows that pigment is uniformly dispersed throughout the entire mass.

Polymer as just prepared is crushed and sieved, the portion passing a 14 mesh screen and remaining on a 20 mesh screen (U.S. Sieve Series), being retained for use as molding powder. Thus, preparation of molding powder can be greatly simplified. Working and reworking of pigmented polymer can be avoided and uniform product obtained in a relatively simple manner. Again, if it is desired, the polymer as first obtained may be crushed, extruded, and then pelletized to give a good molding powder.

(c) Another portion of the above master mix is taken and treated with syndiotactic poly(methyl methacrylate) of a molecular weight of about 80,000 (viscosity average), there being dissolved 2.1 parts of this polymer per 100 parts of the master mix. A separate solution is prepared by dissolving 25 parts of isotactic poly(methyl methacrylate) of a viscosity average molecular weight of about 120,000 in 75 parts of methyl methacrylate. This isotactic polymer was prepared by polymerizing methyl methacrylate in toluene solution at 0° C. with a Grignard reagent and precipitating the resulting polymer with petroleum ether. There are mixed 400 parts of the solution containing syndiotactic polymer and 100 parts of the solution of isotactic polymer by metering these solutions and running them together into a cellophane bag. The resulting mixture is polymerized according to the same cycle as given above. The polymer which results contains pigment uniformly dispersed throughout. It may likewise be prepared as a molding powder.

*Example 2*

A master colorant suspension is prepared by milling 34 parts of cadmium sulfoselenide pigment into 66 parts of cellulose acetate-butyrate and dissolving the resulting mixture in 800 parts of methyl methacrylate. There are then mixed with good agitation 9400 parts of methyl methacrylate, 300 parts of commercial granulated poly(methyl methacrylate) formed by conventional free radical polymerization and having a molecular weight of about 3,000,000 (this polymer behaves as an amorphous one, but actually contains sequences which are syndiotactic in nature), 30 parts of oleic acid, 30 parts of butyl lactate, 758 parts of the master colorant suspension, and 250 parts of isotactic poly(methyl methacrylate) which was prepared in toluene solution with a Grignard reagent and having a molecular weight of 250,000 (viscosity average). The resulting mixture is heated to about 70° C. and treated with 2.5 parts of benzoyl peroxide. The mixture is then run into a standard glass-sided mold. The mold was prepared from two sheets of plate glass spaced apart with strips of commercial poly(methyl methacrylate) and the edges were sealed with paper tape. The temperature of the mixture in the mold is 60° C. and the mixture forms a gel. The mold is maintained at 60° C. for 18 hours and at 120° C. for 2 hours. There results a sheet of pigmented polymer which appears uniform on both sides and from top to bottom.

For purposes of comparison, a similar mix is prepared, but no isotactic poly(methyl methacrylate) is added. This mix is catalyzed with benzoyl peroxide and polymerized in exactly the same way. The sheets which result show considerable settling of pigment. In molds maintained in the horizontal position, there is obtained a sheet which exhibits two-sidedness. This results from settling of larger particles which give a different appearance from the appearance of the smaller particles.

*Example 3*

There are mixed together 8500 parts of methyl methacrylate, 1000 parts of ethyl acrylate, 200 parts of butyl lactate, 50 parts of salol, 2.5 parts of acetyl peroxide, and 30 parts of oleic acid. There is then dissolved in this mixture with stirring 200 parts of syndiotactic poly(methyl methacrylate) having a molecular weight of 150,000. This polymer was prepared by dissolving methyl methacrylate in liquid ammonia containing sodium amide. This mixture was held at −70° C. while polymer precipitated. The polymer was acid-washed, rinsed with methanol, and dried. After the polymer has been dissolved, there is dispersed in the master mix 30 parts of titanium dioxide. This master mix is subjected to reduced pressure to remove dissolved gases.

A second colorant mix is prepared by dissolving 20 parts of isotactic poly(methyl methacrylate) in 79 parts of methyl methacrylate and adding one part of predispersed channel carbon black pigment. This pigment was dispersed by milling 15 parts of carbon black with 19 parts of plasticizer (dioctyl phthalate) and 67 parts of half-second nitrocellulose. The isotactic polymer was prepared by mixing 50 parts of methyl methacrylate with 750 parts of anhydrous toluene and treating this mixture at −40° C. with 1.3 parts of 9-fluorenyl lithium in 30 parts of benzene and precipitating polymer with methanol. Infrared analysis shows this polymer is isotactic and after crystallization from 4-heptanone it gives the X-ray diffraction pattern of Type II. It has a molecular weight of 170,000. This colorant mix is also degassed under reduced pressure.

The first master mix is run into a mold formed with glass plates held apart by one-half inch spacers. As this white pigmented mix is introduced in the mold, there is injected thereinto the second colorant mix containing carbon black. This causes a rapid gelation to occur with the white pigment uniformly and continuously dispersed and the black pigment in variegated patterns. The mold is then sealed and heated at 55° C. for about 18 hours, and at 120° C. for two hours. The polymer sheet which results is beautifully marbleized.

If polymer is formed from pigmented dispersions as above, but without the addition of syndiotactic and isotactic polymers there results a neutral, grey, characterless sheet with streakings, in which pigment is badly settled.

*Example 4*

A master mix is prepared from 8500 parts of methyl methacrylate, 500 parts of butyl acrylate, 200 parts of dibutyl phthalate, 50 parts of salol, 2.5 parts of acetyl peroxide, 10 parts of unsaturated fatty acids, and 0.2 part of a dye, C. I. Solvent Yellow 33. There is dissolved in this mixture 200 parts of syndiotactic poly(methyl methacrylate). There is separately prepared a solution of isotactic poly(methyl methacrylate) containing carbon black as described in the previous example.

The mix containing dye is run into a mold as described in the previous example, while the solution of isotactic polymer containing carbon black is injected into the flowing stream filling the mold. The mold is then subjected to the same polymerization cycle as in the previous example. There results a polymer sheet having a tortoiseshell effect.

*Example 5*

A master mix is prepared from 8000 parts of methyl methacrylate, 80 parts of stearic acid, 2 parts of lauroyl peroxide, 2 parts of tert-butyl perbenzoate, and 49 parts of methyl salicylate. Into this mixture there is stirred a dispersion of barytes and titanium dioxide which has been milled with a copolymer of methyl methacrylate and ethyl acrylate and taken up with methyl methacrylate, the total amount of pigment being 50 parts. This master mix is then divided into two portions. In one portion, there is dissolved 80 parts of syndiotactic poly(methyl methacrylate) which has been prepared by anionic polymerization in liquid ammonia. Thereafter, there is dispersed in this mixture 280 parts of a commercial synthetic "pearl" (a lead arsenate) dispersed with half second nitrocellulose. In the other portion there is dissolved 100 parts of isotactic poly(methyl methacrylate) having a molecular weight of about 25,000, which has been prepared by anionic polymerization in toluene with a Grignard catalyst. The two solutions are run together (after degassing) into a glass-sided mold. The mold is held in an oven at 65.7° for 16 hours, and then is heated at 120° for 4 hours. The resulting polymer sheet has a pleasant pearlescent appearance.

*Example 6*

A mixture is prepared from 9,000 parts of methyl methacrylate, 1,000 parts of ethyl acrylate, 100 parts of stearic acid, 2.5 parts of acetyl peroxide, 2 parts of tert-butyl hydroperoxide, and 50 parts of methyl salicylate. There is dissolved in this mixture 250 parts of isotactic poly(methyl methacrylate) having a molecular weight of about 200,000. There is then stirred into the mixture 33 parts of a carbon black dispersion containing 7 parts of carbon, 5 parts of plasticizer and 21 parts of cellulose acetate-butyrate.

A second mixture is prepared from 500 parts of methyl methacrylate, one part of lauroyl peroxide, 100 parts of syndiotactic poly(methyl methacrylate) having a molecular weight of about 40,000, 15 parts of phthalocyanine green pigment and 50 parts of titanium dioxide, the pigments having been dispersed with cellulose acetate-butyrate.

The two solutions are metered into a glass-sided mold as in previous examples. The mold is subjected to the heat cycle described in Example 1. There results a marbleized pigmented sheet with swirls of white and green in a black background, resembling Italian onyx.

The above procedure is followed with comparable mixtures in which there is used as catalyst azodiisobutyronitrile. Again, a marbleized sheet is obtained.

Thus far, this invention has been shown in its simplest form in which the principle of controlling the distribution of colorant has been illustrated with respect to a single body of solid polymer formed from one or more monovinylidene compounds. If retention of thermoplasticity is desired, the comonomers used are necessarily monovinylidene compounds. If an insoluble, non-thermoplastic object is desired, there is used at least one polyvinylidene compound, particularly in conjunction with one or more monovinylidene compounds. Some cross-linking is observed with even 0.5% of some polyvinylidene compounds copolymerized with one or more monovinylidene compounds. In the range of 3% to 15% of polyvinylidene compound in admixture with one or more monovinylidene compounds the resulting copolymer is no longer thermoplastic or solvent-soluble. As is known, some polyvinylidene compounds by themselves yield quite hard, insoluble, coherent polymers and these can be formed in the presence of Type I and Type II poly(methyl methacrylate) and colorant. By the method of this invention a gel from a monovinylidene compound can be overlaid with a gel of a polyvinylidene compound or a mixture containing a polyvinylidene compound and monovinylidene compound and the whole polymerized in one operation.

Example 7

A master mix is prepared from 900 parts of methyl methacrylate, 50 parts of ethylene dimethacrylate, 50 parts of butyl acrylate, 10 parts of oleic acid, 5 parts of salol, 0.2 part of acetyl peroxide, and 0.05 part of tert-butyl hydroperoxide. A portion of 100 parts of this mixture is taken for solution of 4 parts of crystallizable poly(methyl methacrylate) having a molecular weight of about 240,000 (viscosity average) and giving an infrared absorption spectrum distinctly of the isotactic form. There is then stirred into this portion 0.5 part of brown iron oxide dispersed in cellulose acetate-butyrate. The rest of the above mixture is treated with 8 parts of well developed syndiotactic poly(methyl methacrylate) of a viscosity average molecular weight of about 120,000.

There is also mixed therewith 2.5 parts of zinc oxide dispersed in cellulose acetate-butyrate. The two portions are degassed under reduced pressure and run into a mold for making sheets. The portion with brown iron oxide is injected into the second portion as it flows into the mold. The loaded cell is then subjected to a polymerization cycle of 15 hours at about 45° C., the temperature being partially controlled when necessary by cooling with air, two hours at 80°–85° C., two hours at 100° C. and two hours at 110°–120° C. There results a very hard sheet which is solvent and abrasion resistant and is useful for such purposes as table tops. It has a pleasing irregular marbleized pattern.

The above procedure is followed with a mixture of 750 parts of allyl diglycolyl allyl glycolate and 250 parts of methyl methacrylate in place of the above methacrylates and acrylate. In this case, the polymerization cycle may desirably be advanced over that above, because the allyl compounds undergo polymerization less readily than the acrylic compounds. Initial polymerization is at 60°–65° C. for 16 hours with temperatures being advanced to 120° C. for 2 to 6 hours. The resulting polymer is a decorative, hard, scratch resistant sheet, which can be used where resistance to abrasion and solvents is desirable.

The process of this invention is particularly advantageous for providing multicolored objects. A gel may be formed in a desired shape with a monomer mixture which contains colorant. The gel can then be overlaid with a different monomer mixture which may be gelled in position. This mixture may be clear, colored with a dye, or pigmented. The composite gelled structure is then polymerized. If desired, more than two layers may be used. It is thus possible to form a sheet, for example, with a core of one color with each surface of a different color in a single polymerization.

Example 8

In this example, there are given the details of preparing a multicolored sheet. While only two layers of colored plastic are formed in this particular preparation, the same method can be applied to the formation of more than two layers by obvious expedients. Also, this example illustrates a technique in which the gel which is formed by bringing together Type I poly(methyl methacrylate) and Type II poly(methyl methacrylate) is formed prior to casting and melted before the casting operation.

There are mixed 83,614 parts of methyl methacrylate, 36 parts of acetyl peroxide dissolved in 108 parts of dimethylphthalate, 100 parts of unsaturated fatty acids, 500 parts of salol, 200 parts of stearic acid, and 550 parts of titanium dioxide. In one part of this mixture, there is dissolved 10,000 parts of syndiotactic poly(methyl methacrylate), in the other part of this mixture, there is dissolved 5,000 parts of isotactic poly(methyl methacrylate). The two solutions are then poured together. The mixture rapidly forms a gel. This gel is heated with stirring until methyl methacrylate begins to boil. In this way, dissolved gases are driven off and, at the same time, gel is melted.

The hot mixture is poured into a glass mold in which it is cooled to about 25° C. During the cooling, the gel re-forms. The glass plate forming one side of the mold is removed, and thicker spacers are inserted in place of the original spacers, and the mold is re-assembled.

A second mixture with the same general formulation as given above is prepared, but the titanium dioxide pigment is replaced with 300 parts of cadmium sulfoselenide pigment. This mixture is also heated to boiling. The hot liquid which results is poured into the mold to form a second layer over the first layer of gel. The mold is cooled and then heated at 65° C. for 16 hours and then for one hour at 125° C. The mold is readily parted to yield a two-colored sheet. The two layers are clearly defined and are not separable by mechanical means. The sharpness of definition of the two layers is of considerable advantage. This marks a definite improvement over the forming of multicolored sheets by techniques of the art which result in considerable bleeding of color from one layer into the other.

Example 9

A colored mixture is prepared with the same weights of methyl methacrylate, acetyl peroxide, unsaturated fatty acids, stearic acid, salol, syndiotactic poly(methyl methacrylate) and isotactic poly(methyl methacrylate) as in the previous example, there being substituted, however, 20 parts of predispersed phthalocyanine green in place of the above titanium dioxide. The jelled mixture is heated in the same way above the melting point of the gel and the boiling point of the methyl methacrylate. It is then poured into a wedge-shaped mold. This mold is prepared by separating two glass plates with one-eighth inch plastic spacers at the top with no spacers at the bottom or sides, these being sealed with paper strips. The melted gel is poured into this cell and the cell is then cooled to about room temperature. The top light of the glass is then removed from the mold, uniform spacers are placed about the edges of the mold, and the mold is then filled from the bottom and with a mixture prepared from the following:

99,000 parts of methyl methacrylate, 26 parts of acetyl peroxide in 108 parts of dimethyl phthalate, 100 parts of unsaturated fatty acids, 500 parts of salol, and 200 parts of stearic acid. This mixture is degassed under reduced pressure before being admitted to the mold. The mold is then heated for 16 hours at 60°–65° C., for one hour at 80°–90° C., and for one hour at 120° C.

There results a plastic sheet in which the color is uniformly graded from dark to very light. If desired, this sheet may be covered with thin glass sheets for use in automotive glazing.

A sheet with one surface of one color and the other surface of another color may be used in this form or, if desired, one colored surface may be cut through or engraved to give patterns which are set off by the color of the uncut surface. Such multi-colored sheets are useful for signs. Multi-message displays may be developed in such structures.

As a variation of this overlay procedure, the first gel may be formed in a mold which forms a design, pattern, configuration, or shape in cameo or intaglio, which may then be overlaid with a clear gel or a colored gel, and the assembly is then polymerized. In this way, the design, pattern, configuration, or shape can be present within a continuous casting which may have smooth external surfaces. On the other hand, one or both external surfaces may be formed with a design or pattern, including light reflecting cells.

A variation in these procedures is to form a gel, place thereon a solid substance, and cover it with additional monomer which is preferably gelled in place in accordance with the principles here disclosed. One or both of the gelled layers may be pigmented, one may be pigmented and the other may be clear, including clear, dyed gel; again, neither gel need be pigmented. In the last case, the gel serves to suspend or support the solid substance.

The solid substance may take any form suitable for embedding within the final casting. Thus, there may be used flakes of minerals, polymers, or metals, metal spangles, leaves, buds, feathers, flowers, or animal tissue. Fabric may be stretched over the first gel and then embedded. If desired, the fabric may carry a design or scene.

Another variation which is made available by the principles of this invention is the preparation of colored bodies, particularly sheets, with uniform gradation of color from one boundary to another. This is readily accomplished by forming a colored gel in a mold which gives a wedge shape. One side of the mold is removed, spacers about the gel in the form of a wedge are replaced with larger spacers, the mold is formed again, a polymerizable monomer mix is placed in the cell over the wedge, and the resulting assembly is subjected to polymerizing conditions.

In the above illustrative examples methyl methacrylate has been shown as the principal monovinylidene monomer and has been used in conjunction with other monomers, including a typical cross-linking polyvinylidene compound. As has been emphasized above, other vinylidene monomers may be used in which syndiotactic and isotactic poly(methyl methacrylate) are soluble and which yield solid polymers. The poly(methyl methacrylate) need not be completely soluble in or compatible with the polymer of the vinylidene compound. In fact, some very desirable effects are obtained by use of such compound. A typical example is styrene.

*Example 10*

A mixture is prepared from 2000 parts of syndiotactic poly(methyl methacrylate) in 23,000 parts of styrene. A second mixture is prepared from 2000 parts of isotactic poly(methyl methacrylate) dissolved in 23,000 parts of styrene. A third mixture is prepared from 47,000 parts of styrene, 1,500 parts of α-methylstyrene, 500 parts of stearic acid and 500 parts of salol. The three solutions are separately heated to boiling to de-gas each mixture. There is then dissolved in the third mixture 200 parts of tert-butyl hydroperoxide and 300 parts of benzoyl peroxide. The three solutions are mixed and the resulting mixture is run into a mold for a sheet. The mold is cooled and then heated for 16 hours at 60°–70°; for one hour at 80°–85°, and for one hour at 120° C. There results a translucent plastic sheet which is unusually uniform over its entire area in its light transmission properties.

I claim:

1. A process for preparing polymers of improved properties which comprises dissolving in a polymerizable vinylidene compound a small proportion of poly(methyl methacrylate) of isotactic structure, bringing the resulting solution into contact with a solution of poly(methyl methacrylate) of syndiotactic structure, whereby a gel is formed, an polymerizing said gel under the influence of a free radical initiator.

2. A process for preparing polymers of improved properties which comprises forming a first solution of poly(methyl methacrylate) of isotactic structure in a polymerizable vinylidene monomer, preparing a second solution by dissolving poly(methyl methacrylate) of syndiotactic structure in a polymerizable vinylidene monomer, mixing the first and second solutions, whereby a gel is formed, and initiating polymerization of said gel with a free radical initiator below the melting point of the gel.

3. A process for preparing polymer containing decorative material which comprises polymerizing under the influence of a free radical initiator a monovinylidene compound which forms a solid polymer, which has dissolved therein poly(methyl methacrylate) of isotactic structure, and which also contains poly(methyl methacrylate) of syndiotactic structure at a temperature at which a gel forms from interaction between the poly(methyl methacrylate) of isotactic structure and the poly(methyl methacrylate) of syndiotactic structure.

4. A process for preparing polymer containing pigment which comprises mixing a solution of poly(methyl methacrylate) of isotactic structure in a vinylidene compound which polymerizes to a solid and in which the said poly(methyl methacrylate) is soluble with a vinylidene compound which polymerizes to a solid and in which poly(methyl methacrylate) of syndiotactic structure is present and polymerizing the mixture with pigment present under the influence of a free radical initiator at a temperature at which a gel forms from interaction of poly(methyl methacrylate) of isotactic structure and poly(methyl methacrylate) of syndiotactic structure.

5. A process for preparing decorative polymers which comprises dissolving poly(methyl methacrylate) of isotactic structure in polymerizable monomer comprising methyl methacrylate, bringing the resulting solution into admixture with a solution of poly(methyl methacrylate) of syndiotactic structure, having decorative material present in the resulting admixture, and polymerizing said admixture under the influence of a free radical initiator at a temperature for initiating polymerization at which a gel forms from interaction of poly(methyl methacrylate) of isotactic structure with poly(methyl methacrylate) of syndiotactic structure.

6. A process for preparing decorative polymers which comprises mixing a solution containing methyl methacrylate and poly(methyl methacrylate) of isotactic structure and a solution containing methyl methacrylate and poly(methyl methacrylate) of syndiotactic structure, whereby a gel is formed, placing decorative material on a surface of said gel, covering this surface with a polymerizable vinylidene compound, and polymerizing the resulting structure under the influence of a free radical initiator, polymerization being initiated below the melting point of said gel.

7. A process for preparing decorative polymers which comprises mixing a solution containing methyl methacrylate and poly(methyl methacrylate) of isotactic structure with a solution containing methyl methacrylate and poly(methyl methacrylate) of syndiotactic structure, whereby a gel is formed, decorating a surface of said gel, covering the decorated surface with a mixture of a solution containing poly(methyl methacrylate) of isotactic structure in a vinylidene compound which forms a solid polymer and a solution containing poly(methyl methacrylate) of syndiotactic structure in a vinylidene compound which forms a solid polymer, and polymerizing the resulting assembly under the influence of a free radical initiator, polymerization being initiated below the melting point of said gel.

8. A process for preparing decorative polymers which comprises mixing a solution containing methyl methacrylate, poly(methyl methacrylate) of isotactic structure, and a pigment with a solution containing methyl methacrylate and poly(methyl methacrylate) of syndiotactic structure, whereby a gel is formed, covering a surface of said gel with a mixture of a solution containing methyl methacrylate and poly(methyl methacrylate) of isotactic structure and a solution containing methyl methacrylate and poly(methyl methacrylate) of syndiotactic structure, and polymerizing the resultant assembly under the influence of a free radical initiator, polymerization being initiated below the melting point of the gel.

9. A process for preparing decorative polymers, which comprises forming a first solution comprising methyl methacrylate, poly(methyl methacrylate) of isotactic structure, and pigment, forming a second solution comprising methyl methacrylate, poly(methyl methacrylate) of syndiotactic structure, and pigment, mixing said first and second solutions, and polymerizing the resulting mixture under the influence of a free radical initiator, initiation of polymerization being effected below 100° C. and at temperatures at which a gel forms from interaction of poly(methyl methacrylate) of isotactic structure with poly(methyl methacrylate) of syndiotactic structure.

10. A process for preparing decorative polymers which comprises forming a first solution comprising styrene and poly(methyl methacrylate) of isotactic structure, forming a second solution comprising styrene and a poly (methyl methacrylate) of syndiotactic structure, mixing said first and said second solutions, and polymerizing the resulting mixture under the influence of a free radical initiator, initiation of polymerization being effected below 100° C. and at temperatures at which a gel forms from interaction of poly(methyl methacrylate) of isotactic structure with poly(methyl methacrylate) of syndiotactic structure.

11. A process for preparing decorative polymers which comprises dissolving poly(methyl methacrylate) of isotactic structure in polymerizable monomer comprising methyl methacrylate in major proportion, forming a solution of poly(methyl methacrylate) of syndiotactic structure in polymerizable monomer comprising a major proportion of methyl methacrylate, forming a mixture of the polymerizable monomer containing poly(methyl methacrylate) of isotactic structure and the polymerizable monomer containing poly(methyl methacrylate) of syndiotactic structure, having present in said mixture a decorative material, and polymerizing the mixture under the influence of a free radical initiator, initiation of polymerization being effected below 100° C. and at a temperature at which a gel forms from interaction of the poly(methyl methacrylate) of isotactic structure with the poly(methyl methacrylate) of syndiotactic structure.

12. A process for preparing pigment-containing polymer which comprises forming a solution of poly(methyl methacrylate) of isotactic structure in a vinylidene compound which polymerizes to a solid, forming a solution of poly(methyl methacrylate) of syndiotactic structure, mixing the two solutions together with pigment, whereby a gel forms, heating said gel above its melting point and below the boiling points of the vinylidene compounds used, casting the melted mixture in a mold, cooling the mixture in the mold below the melting point of the gel, and polymerizing the resulting gel under the influence of a free radical initiator.

13. A process for preparing pigmented polymer, which comprises preparing a solution of poly(methyl methacrylate) of isotactic structure in monomeric methyl methacrylate, forming a solution of poly(methyl methacrylate) of syndiotactic structure in monomeric methyl methacrylate, mixing the two solutions together with pigment, whereby a gel forms, heating said gel above its melting point and below the boiling point of the methyl methacrylate, casting the melted mixture, cooling the cast mixture below the melting point of the gel, and polymerizing the resulting gel under the influence of a free radical initiator.

No references cited.